(12) United States Patent
Lafferty et al.

(10) Patent No.: US 11,247,433 B2
(45) Date of Patent: Feb. 15, 2022

(54) SUSCEPTOR STRUCTURE

(71) Applicant: Graphic Packaging International, LLC, Atlanta, GA (US)

(72) Inventors: Terrence P. Lafferty, Neenah, WI (US); Scott W. Middleton, Oshkosh, WI (US)

(73) Assignee: Graphic Packaging International, LLC, Atlanta, GA (US)

( * ) Notice: Subject to any disclaimer, the term of this patent is extended or adjusted under 35 U.S.C. 154(b) by 536 days.

(21) Appl. No.: 16/256,207

(22) Filed: Jan. 24, 2019

(65) Prior Publication Data

US 2019/0168483 A1    Jun. 6, 2019

Related U.S. Application Data

(60) Division of application No. 14/843,176, filed on Sep. 2, 2015, now Pat. No. 10,226,910, which is a division
(Continued)

(51) Int. Cl.
*B32B 7/12* (2006.01)
*B32B 7/14* (2006.01)
(Continued)

(52) U.S. Cl.
CPC .................. *B32B 7/12* (2013.01); *B32B 3/28* (2013.01); *B32B 7/14* (2013.01); *B32B 27/08* (2013.01);
(Continued)

(58) Field of Classification Search
CPC ........ B32B 2307/304; B32B 2307/306; B32B 2307/402; B32B 2307/412;
(Continued)

(56) References Cited

U.S. PATENT DOCUMENTS 3,662,139 A    5/1972    Love
4,036,088 A    7/1977    Ruskin
(Continued)

FOREIGN PATENT DOCUMENTS

EP    0 943 558 B1    11/2006
JP    3-205016    9/1991
(Continued)

OTHER PUBLICATIONS

International Search Report and Written Opinion for PCT/US2008/077168 dated Apr. 22, 2009.
(Continued)

*Primary Examiner* — Dana Ross
*Assistant Examiner* — James F Sims, III
(74) *Attorney, Agent, or Firm* — Womble Bond Dickinson (US) LLP

(57) ABSTRACT

A microwave energy interactive structure includes a first susceptor film including a first layer of microwave energy interactive material supported on a first polymer film, a moisture-containing layer joined to the first layer of microwave energy interactive material, an adjoining layer joined to the moisture-containing layer such that the moisture-containing layer is disposed between the susceptor film and the adjoining layer, and a second layer of microwave energy interactive material on a side of the adjoining layer opposite the moisture-containing layer. The adjoining layer may be joined to the moisture-containing layer by a discontinuous adhesive layer.

11 Claims, 8 Drawing Sheets

Related U.S. Application Data of application No. 13/104,244, filed on May 10, 2011, now Pat. No. 9,162,428, which is a continuation-in-part of application No. PCT/US2009/063963, filed on Nov. 11, 2009.

(60) Provisional application No. 61/198,981, filed on Nov. 12, 2008.

(51) Int. Cl.

| | | |
|---|---|---|
| *B32B 27/10* | (2006.01) | |
| *B32B 27/28* | (2006.01) | |
| *B32B 27/32* | (2006.01) | |
| *B32B 27/34* | (2006.01) | |
| *B32B 27/36* | (2006.01) | |
| *B32B 29/08* | (2006.01) | |
| *B32B 27/08* | (2006.01) | |
| *B32B 3/28* | (2006.01) | |
| *H05B 6/64* | (2006.01) | |

(52) U.S. Cl.
CPC ............ *B32B 27/10* (2013.01); *B32B 27/281* (2013.01); *B32B 27/285* (2013.01); *B32B 27/286* (2013.01); *B32B 27/32* (2013.01); *B32B 27/34* (2013.01); *B32B 27/36* (2013.01); *B32B 29/08* (2013.01); *H05B 6/6494* (2013.01); *B32B 2307/304* (2013.01); *B32B 2307/306* (2013.01); *B32B 2307/402* (2013.01); *B32B 2307/412* (2013.01); *B32B 2439/00* (2013.01); *B32B 2439/70* (2013.01)

(58) Field of Classification Search
CPC . B32B 2439/00; B32B 2439/70; B32B 27/08; B32B 27/10; B32B 27/281; B32B 27/285; B32B 27/286; B32B 27/34; B32B 27/36; B32B 29/08; B32B 3/28; B32B 7/12; B32B 7/14; B32B 27/32; H05B 6/6494
See application file for complete search history.

(56) References Cited

U.S. PATENT DOCUMENTS

| | | |
|---|---|---|
| 4,398,994 A | 8/1983 | Beckett |
| 4,552,614 A | 11/1985 | Beckett |
| 4,703,148 A | 10/1987 | Mikulski et al. |
| 4,743,488 A | 5/1988 | Jones |
| 4,775,771 A | 10/1988 | Pawlowski |
| 4,777,053 A | 10/1988 | Tobelmann et al. |
| 4,865,921 A | 9/1989 | Hollenberg |
| 4,883,936 A | 11/1989 | Maynard et al. |
| 4,890,439 A | 1/1990 | Smart |
| 4,896,009 A | 1/1990 | Pawlowski |
| 4,927,991 A | 5/1990 | Wendt et al. |
| 4,936,935 A | 6/1990 | Beckett |
| 4,963,424 A | 10/1990 | Beckett |
| 5,038,009 A | 8/1991 | Babbitt |
| 5,041,295 A | 8/1991 | Perry et al. |
| 5,053,594 A | 10/1991 | Thota et al. |
| 5,079,397 A | 1/1992 | Keefer |
| 5,093,364 A | 3/1992 | Richards |
| 5,117,078 A | 5/1992 | Beckett |
| 5,170,025 A | 12/1992 | Perry |
| 5,213,902 A | 5/1993 | Beckett |
| 5,220,143 A | 6/1993 | Kemske et al. |
| 5,221,419 A | 6/1993 | Beckett |
| 5,239,153 A | 8/1993 | Beckett |
| 5,260,537 A | 11/1993 | Beckett |
| 5,266,386 A | 11/1993 | Beckett |
| 5,277,954 A | 1/1994 | Carpenter |
| 5,278,378 A | 1/1994 | Beckett |
| 5,310,977 A | 5/1994 | Stenkamp et al. |
| 5,317,120 A | 5/1994 | Bunke |
| RE34,683 E | 8/1994 | Maynard |
| 5,334,820 A | 8/1994 | Risch et al. |
| 5,340,436 A | 8/1994 | Beckett |
| 5,354,973 A | 10/1994 | Beckett |
| 5,391,864 A | 2/1995 | Bodor et al. |
| 5,410,135 A | 4/1995 | Pollart |
| 5,424,517 A | 6/1995 | Habeger |
| 5,466,917 A | 11/1995 | Matsuki et al. |
| 5,519,195 A | 5/1996 | Keffer |
| 5,527,413 A | 6/1996 | Perry et al. |
| 5,585,027 A | 12/1996 | Young |
| 5,628,921 A | 5/1997 | Beckett |
| 5,672,407 A | 9/1997 | Beckett |
| 5,759,422 A | 6/1998 | Schmelzer |
| 5,800,724 A | 9/1998 | Habeger et al. |
| 6,114,679 A | 9/2000 | Lai |
| 6,133,560 A | 10/2000 | Zeng et al. |
| 6,137,099 A | 10/2000 | Hamblin |
| 6,150,646 A | 11/2000 | Lai |
| 6,204,492 B1 | 3/2001 | Zeng |
| 6,251,451 B1 | 6/2001 | Zeng |
| 6,414,290 B1 | 7/2002 | Cole |
| 6,433,322 B2 | 8/2002 | Zeng |
| 6,455,827 B2 | 9/2002 | Zeng |
| 6,552,315 B2 | 4/2003 | Zeng |
| 6,677,563 B2 | 1/2004 | Lai |
| 6,717,121 B2 | 4/2004 | Zeng |
| 6,765,182 B2 | 7/2004 | Cole |
| 7,019,271 B2 | 3/2006 | Wnek et al. |
| 7,323,669 B2 | 1/2008 | Robison et al. |
| 7,351,942 B2 | 4/2008 | Wnek et al. |
| 7,365,292 B2 | 4/2008 | Cole et al. |
| 7,868,274 B2 | 1/2011 | Bohme et al. |
| 7,982,168 B2 | 7/2011 | Middleton et al. |
| 7,994,456 B2 | 8/2011 | Ford et al. |
| 8,008,609 B2 | 8/2011 | Noyelle et al. |
| 8,158,914 B2 | 4/2012 | Wnek et al. |
| 8,629,380 B2 | 1/2014 | Lafferty |
| 9,162,428 B2 | 10/2015 | Lafferty et al. |
| 2001/0032843 A1 | 10/2001 | Aronsson et al. |
| 2003/0080119 A1 | 5/2003 | Chisholm et al. |
| 2004/0023000 A1 | 2/2004 | Young et al. |
| 2005/0230384 A1 | 10/2005 | Robison |
| 2006/0049190 A1 | 3/2006 | Middleton et al. |
| 2006/0157480 A1 | 7/2006 | Lafferty |
| 2007/0039951 A1 | 2/2007 | Cole |
| 2007/0221666 A1 | 9/2007 | Keefe et al. |
| 2007/0251943 A1 | 11/2007 | Wnek |
| 2008/0000896 A1 | 1/2008 | Lafferty et al. |
| 2008/0087664 A1 | 4/2008 | Robison et al. |
| 2008/0164178 A1 | 7/2008 | Wnek et al. |
| 2008/0230537 A1 | 9/2008 | Lafferty |
| 2009/0032529 A1 | 2/2009 | Lafferty |
| 2009/0218338 A1 | 9/2009 | Fitzwater |
| 2009/0302032 A1 | 12/2009 | Middleton |
| 2010/0012652 A1 | 1/2010 | Cole |
| 2011/0220640 A1 | 9/2011 | Conatser et al. |

FOREIGN PATENT DOCUMENTS

| | | |
|---|---|---|
| JP | 5-43705 | 11/1993 |
| JP | 3039410 | 4/1997 |
| JP | 3079164 | 6/2000 |
| JP | 2009-532088 | 9/2009 |
| JP | 2009-532280 | 9/2009 |
| WO | WO 91/09791 A1 | 7/1991 |
| WO | WO 98/08752 A2 | 3/1998 |
| WO | WO 01/22778 A1 | 3/2001 |
| WO | WO 2007/103428 A2 | 9/2007 |
| WO | WO 2009/114038 A1 | 9/2009 |
| WO | WO 2011/112770 A2 | 9/2011 |

OTHER PUBLICATIONS

Declaration of Terrence P. Lafferty dated May 10, 2011.
Notification of Reason for Refusal for JP 2011-536427 dated Dec. 27, 2012, and English translation.

(56) References Cited

OTHER PUBLICATIONS

International Search Report and Written Opinion for PCT/US2011/027825 dated Nov. 30, 2011.
Office Action for U.S. Appl. No. 13/104,244 dated Mar. 7, 2014.
Response to Election of Species Requirement for U.S. Appl. No. 13/104,244 dated May 1, 2014.
Office Action for U.S. Appl. No. 13/104,244 dated Sep. 3, 2014.
Amendment A and Response to Office Action for U.S. Appl. No. 13/104,244 dated Dec. 3, 2014.
Office Action for U.S. Appl. No. 13/104,244 dated Mar. 25, 2015.
Amendment B and Response to Final Office Action for U.S. Appl. No. 13/104,244 dated Jun. 25, 2015.
Notice of Allowance and Fee(s) Due for U.S. Appl. No. 13/104,244 dated Jul. 16, 2015.
Part B Fee(s) Transmittal for U.S. Appl. No. 13/104,244 dated Sep. 15, 2015.
Issue Notification for U.S. Appl. No. 13/104,244 dated Sep. 30, 2015.
Office Action for U.S. Appl. No. 14/843,176 dated Dec. 8, 2017.
Response to Election of Species for U.S. Appl. No. 14/843,176 dated Jan. 2, 2018.
Office Action for U.S. Appl. No. 14/843,176 dated Apr. 25, 2018.
Amendment A and Response to Office Action for U.S. Appl. No. 14/843,176 dated Jun. 4, 2018.
Office Action for U.S. Appl. No. 14/843,176 dated Jul. 31, 2018.
Request for Continued Examination (RCE) Transmittal for U.S. Appl. No. 14/843,176 dated Oct. 12, 2018.
Amendment B and Response to Final Office Action for U.S. Appl. No. 14/843,176 dated Oct. 12, 2018.
Notice of Allowance and Fee(s) Due for U.S. Appl. No. 14/843,176 dated Oct. 29, 2018.
Issue Fee Transmittal Form for U.S. Appl. No. 14/843,176 dated Jan. 24, 2019.
Issue Notification for U.S. Appl. No. 14/843,176 dated Feb. 20, 2019.

SUSCEPTOR STRUCTURE

CROSS-REFERENCE TO RELATED APPLICATIONS

This application is a divisional of U.S. patent application Ser. No. 14/843,176, filed Sep. 2, 2015, which is a divisional of U.S. patent application Ser. No. 13/104,244, filed May 10, 2011, now U.S. Pat. No. 9,162,428, which is a continuation-in-part of International Application No. PCT/US2009/063963, filed Nov. 11, 2009, which claims the benefit under 35 U.S.C. § 119(e) of U.S. Provisional Application No. 61/198,981, filed Nov. 12, 2008, which are incorporated by reference herein in their entirety.

BACKGROUND

Susceptors have been used in conventional microwave heating packages to enhance the heating, browning, and/or crisping of food items. A susceptor generally comprises a thin layer of microwave energy interactive material (generally less than about 100 angstroms in thickness, for example, from about 60 to about 100 angstroms in thickness, and having an optical density of from about 0.15 to about 0.35, for example, about 0.21 to about 0.28) that tends to absorb at least a portion of impinging microwave energy and convert it to thermal energy (i.e., heat) at the interface with the food item. Susceptors are typically supported on a microwave energy transparent substrate, for example, a polymer film, thereby collectively forming a "susceptor film". Susceptor films, in turn, are often joined to a dimensionally stable supporting material (or "support"), for example, paper or paperboard ("moisture-containing supports" or "fiber-based supports"), to collectively define a "supported susceptor film".

Supported susceptor films may be used alone or in combination with numerous other materials to form various microwave heating constructs. However, when the exposed side of the moisture-containing support is joined to another layer using a continuous layer of adhesive, the resulting structure may tend to delaminate during heating. While not wishing to be bound by theory, it is believed that during heating, the moisture in the moisture-containing support is released as water vapor, which exerts a pressure on the adjacent layers of the structure. With no path for the water vapor to escape, the layers of the structure tend to delaminate and loft away from one another. In some cases, this lofting or pillowing of the structure can cause the food item seated on the structure to be turned over or toppled undesirably. This phenomenon has been observed both when the supported susceptor film has been joined to another fiber-based layer and when the supported susceptor film has been joined to another polymer film layer.

It is known that structures with more than one susceptor may generate more heat than structures with a single susceptor. Thus, in such multi-susceptor structures, the risk of delamination may be amplified. For example, where a structure comprises a pair of susceptor films joined to opposite sides of a support layer (e.g., paper or paperboard) using continuous layers of adhesive (as is needed to stabilize the susceptor film), the structure may tend to delaminate or rupture upon heating. Thus, there remains a need for a multi-susceptor structure that resists unintentional, uncontrolled delamination during use. There also remains a need for a method of making such a structure.

SUMMARY

This disclosure relates generally to various microwave energy interactive structures, various constructs formed from such structures, various methods of making and such structures and constructs, and various methods of using such structures and constructs to heat, brown, and/or crisp a food item in a microwave oven.

The structures generally comprise a supported susceptor film, which includes a susceptor layer disposed between a polymer film layer and a moisture-containing support layer (e.g., paper or paperboard), and an adjoining layer, for example, a polymer film, paper layer, or paperboard layer. The moisture-containing layer is joined to the adjoining layer using any suitable method that allows for the release of moisture from the moisture-containing layer without causing uncontrolled or undesirable lamination of the structure.

In one example, the moisture-containing support layer is joined to the adjoining layer using a discontinuous layer of adhesive. The discontinuous layer of adhesive may be applied in a pattern, a random configuration, or any other manner that results in the formation of passageways through the adhesive layer that allow the water vapor to be released from the structure.

By way of example, and not limitation, one exemplary structure according to the disclosure may include two supported susceptor films joined to one another using a discontinuous layer of adhesive. The supported susceptor films may be joined with their respective moisture-containing layers facing one another, or with the moisture-containing layer of one supported susceptor film being joined to the polymer film of the other supported susceptor film.

Another exemplary structure according to the disclosure may include a supported susceptor film joined to a microwave energy interactive insulating material using a discontinuous layer of adhesive. The microwave energy interactive insulating material ("insulating material") may be any suitable material that both alters the effect of microwave energy on an adjacent food item and that provides some degree of thermal insulation from the microwave heating environment. For example, the insulating material may include one or more susceptor layers in combination with one or more expandable insulating cells.

The various structures may be used to form numerous constructs, packages, or apparatuses (collectively "constructs") for heating, browning, and/or crisping a food item in a microwave oven. Some of such constructs may include, but are not limited to, trays, platforms, sleeves, disks, cards, or pouches.

Other features, aspects, and embodiments of the invention will be apparent from the following description and accompanying figures.

BRIEF DESCRIPTION OF THE DRAWINGS

The description refers to the accompanying schematic drawings in which like reference characters refer to like parts throughout the several views, and in which.

DESCRIPTION

Various aspects of the invention may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

Figure 1A:
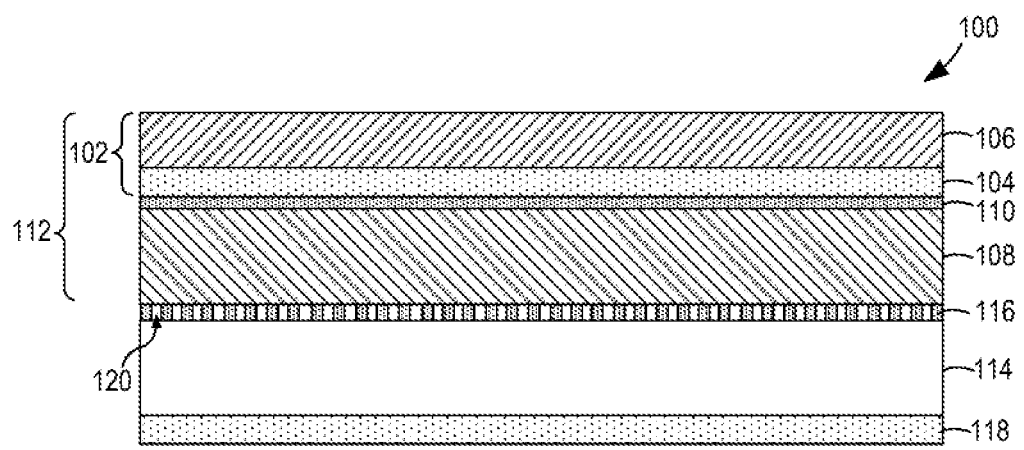
FIG. 1A is a schematic cross-sectional view of an exemplary microwave energy interactive structure.

FIG. 1A schematically illustrates a cross-sectional view of a portion of susceptor structure 100. The structure 100 includes a susceptor film 102, namely, a layer of microwave energy interactive material 104 (e.g., a first layer of microwave energy interactive material) supported on a polymer film 106. The susceptor film 102 is joined to a dimensionally stable, moisture-containing support layer 108 (e.g., a cellulose-based support such as paper or paperboard) using a substantially continuous layer of adhesive 110 to collectively define a supported susceptor film 112. The supported susceptor film 112 is joined to an adjoining layer 114 using a discontinuous layer of adhesive 116. Another layer of microwave energy interactive material 118 (e.g., a second layer of microwave energy interactive material) is disposed within the structure 100 on a side of the adjoining layer 114 opposite the first layer of microwave energy interactive material 104. The second layer of microwave energy interactive material 118 may be joined to the adjoining layer 114 as shown, or in other embodiments, one or more layers may be disposed between the second layer of microwave energy interactive material 118 and the adjoining layer 114. It is also contemplated that the structure 100 may include other layers, as will be discussed further below.

The discontinuous layer of adhesive 116 generally defines joined areas and unjoined areas between the moisture-containing layer 108 and the adjoining layer 114. The unjoined areas may be at least partially interconnected to define one or more passageways 120 that are in open communication with the exposed or open (e.g., unglued) peripheral edges of the adjacent layers 108, 114 of the structure (not shown in FIG. 1A, see, e.g., FIGS. 4B and 4C). When the susceptor structure 100 is exposed to microwave energy, the layers of microwave energy interactive material 104, 118 heat, thereby causing the moisture in the moisture-containing layer 108 to be converted into water vapor. The water vapor may be transported through the open areas 120 within the adhesive layer 116 (i.e., the areas not occupied by adhesive) to the exposed or unglued peripheral edges of the structure 100, where the water vapor can be released. As a result, the various layers of the structure 100 are able to remain laminated to one another. In contrast, the present inventors have found that where a continuous layer of adhesive is used, the layers tend to delaminate from one another during use.

The discontinuous layer of adhesive 116 may comprise a pattern of adhesive areas, a random (or seemingly random) arrangement of adhesive areas, or any other suitable adhesive configuration. In some embodiments, the adhesive areas may comprise discrete adhesive areas circumscribed by non-adhesive areas, which define the venting passageways 120 in the structure 100. The adhesive areas may be solid shapes, open shapes that enclose or circumscribe non-adhesive areas (e.g., an annulus), or any combination thereof.

Figure 1B:
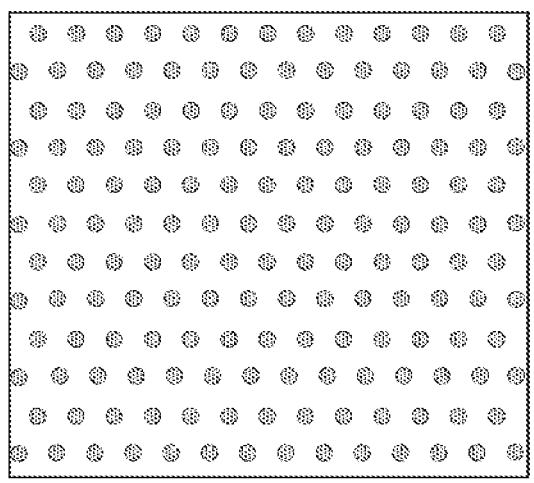
FIGS. 1B-1E schematically depict exemplary patterns of adhesive that may be used to form the construct of FIG. 1A.

In one example, the adhesive areas of the discontinuous adhesive layer 116 may be substantially circular in shape, such that the pattern of adhesive resembles a plurality of dots, for example, as shown in schematic top plan view in FIG. 1B. The adhesive "dots" may have any suitable size, spacing, and arrangement. The adhesive may generally cover less than about 80% of the surface of adjoining layer 114, and in some examples, the adhesive may cover less than about 75%, less than about 70%, less than about 65%, less than about 60%, less than about 55%, less than about 50%, less than about 45%, less than about 40%, or less than about 35% of the adjoining layer 114. In some embodiments, the adhesive may cover from about 35% to about 80% of the adjoining layer 114, for example, from about 45% to about 60% of the adjoining layer 114, from about 34.9% to about 78.5% of the adjoining layer 114. It will be appreciated that the degree of coverage for a particular heating application may depend on numerous factors, including the level of venting needed to prevent delamination of the structure. For example, where multiple susceptor layers (e.g., layers 104, 118) are used, more ventilation may be needed and the adhesive coverage area may be less than a similar structure including only one susceptor layer. Further, where the food item is to be seated on the susceptor structure, it has been determined that less adhesive may be needed where the food item has sufficient weight to assist with keeping the various layers of the susceptor structure intact.

In one exemplary embodiment, the adhesive dots may have a diameter of about 0.0625 in. (about 1.59 mm) and may be spaced about 0.0625 in. (about 1.59 mm) apart, such that the adhesive comprises about 78.5% of the total area of the structure. In another exemplary embodiment, the adhesive dots may have a diameter of about 0.125 in. (about 3.18 mm) and may be spaced about 0.0625 in. (about 1.59 mm) apart, such that the adhesive comprises about 34.9% of the total area of the structure. However, countless other shapes, dimensions, and configurations may be used.

Figure 1C:
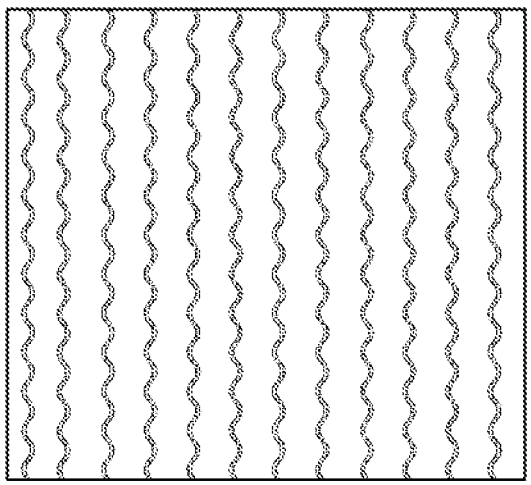
Figure 1D:
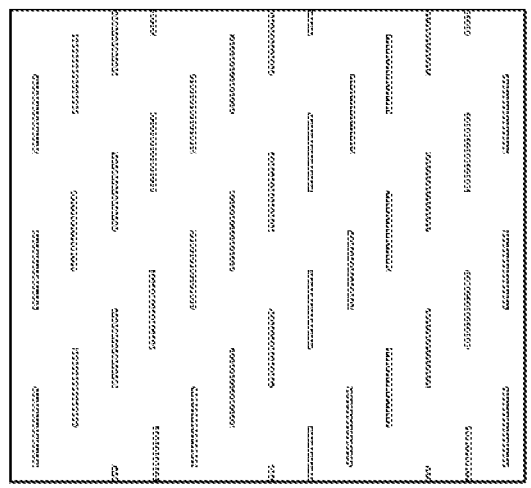
Figure 1E:
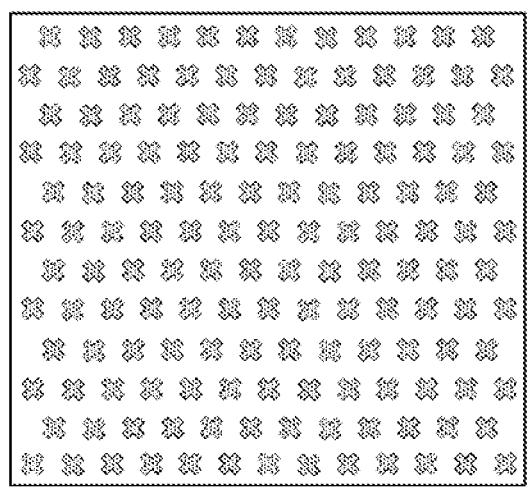

In another example, the adhesive areas of the discontinuous adhesive layer 116 may comprise wavy lines, as shown in schematic top plan view in FIG. 1C. In such an example, the spaces between the adhesive lines define the passageways for the water vapor to be released from the structure. In still another example, the adhesive areas of the discontinuous adhesive layer 116 may be substantially rectangular in shape, such that the pattern of adhesive resembles a plurality of staggered stripes, for example, as shown in schematic top plan view in FIG. 1D. In yet another example, the adhesive areas of the discontinuous adhesive layer 116 may be substantially cross-shaped, as shown in schematic top plan view in FIG. 1E. However, numerous other patterns may be used, provided that such patterns allow the passage of moisture through the open areas 120 in the adhesive layer 116.

As stated previously, the adjoining layer 114 may be any material, for example, a polymer film, paper, or paperboard. Further, it will be understood that additional layers may be joined to the adjoining layer 114 if desired, as will be evident from the remaining discussion.

Numerous variations of the structure 100 of FIG. 1A are contemplated. For example, FIGS. 2-4A schematically depict some exemplary variations of the microwave energy interactive structure 100 of FIG. 1A. The various structures 200, 300, 400, 800 include features that are similar to structure 100 shown in FIG. 1A, except for variations noted and variations that will be understood by those of skill in the art. For simplicity, the reference numerals of similar features are preceded in the figures with a "2" (FIG. 2), "3" (FIG. 3), or "4" (FIG. 4A) instead of a "1".

Figure 2:
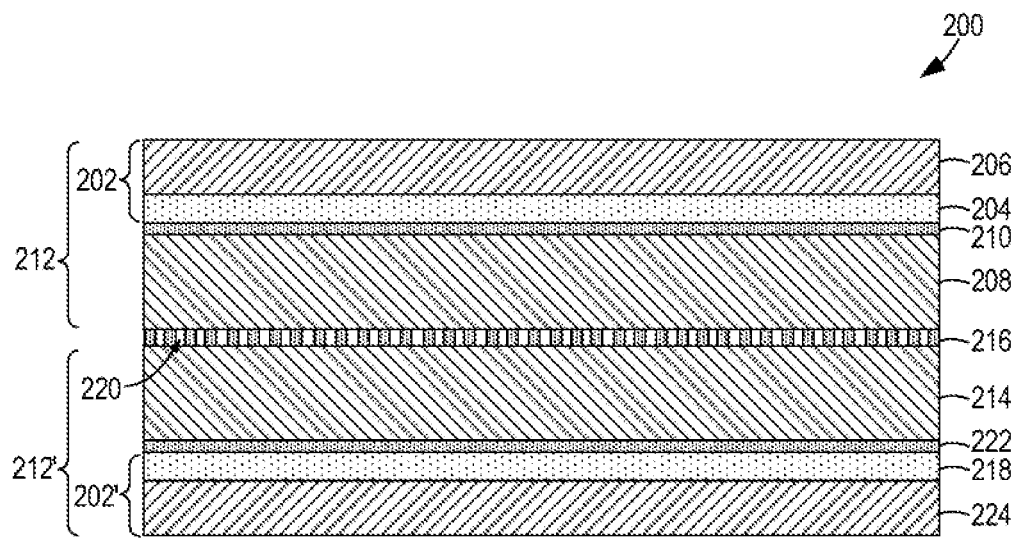
FIG. 2 is a schematic cross-sectional view of another exemplary microwave energy interactive structure.

In the exemplary structure 200 illustrated schematically in FIG. 2, the adjoining layer 214 may be a moisture-containing layer, for example, paper or paperboard. The second layer of microwave energy interactive material 218 may be joined to the adjoining layer 214 by a substantially continuous layer of adhesive 222. The structure 200 may include a second polymer film 224 on a side of the second layer of microwave energy interactive material 218 opposite the adhesive layer 222 to define a second susceptor film 202'. The outermost surface of the first polymer film 206 or the second polymer film 224 may comprise a food-contacting surface of the respective film layer.

Layers 214, 218, 222, 224 generally define a supported susceptor film 212' similar to supported susceptor film 212. The two supported susceptor films 212, 212' are arranged with their respective moisture-containing layers 208, 214 facing one another on opposite sides of the discontinuous layer of adhesive 216, such that the structure 200 is generally symmetrical across the discontinuous layer of adhesive 216. In this example, it is contemplated that the water vapor from both moisture-containing layers 208, 214 may be transported from the interior of the structure 200 via the discontinuities 220 in the adhesive layer 216.

Figure 3:
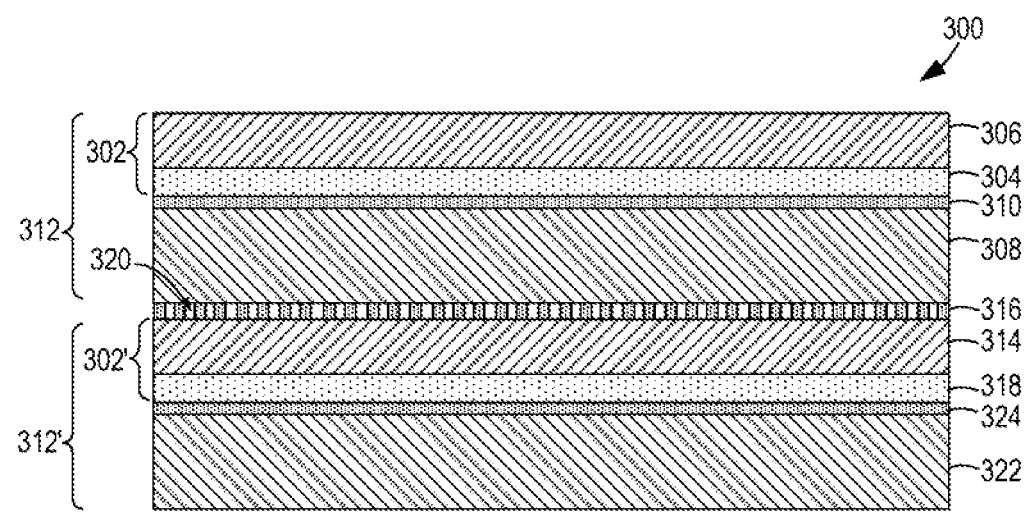
FIG. 3 is a schematic cross-sectional view of still another exemplary microwave energy interactive structure.

In another exemplary structure 300 illustrated schematically in FIG. 3, the adjoining layer 314 may be a polymer film. The structure 300 includes a second moisture-containing layer 322 joined to the second layer of microwave energy interactive material 318 with a substantially continuous layer of adhesive 324. The outermost surface of polymer film 306 may comprise a food-contacting surface of the structure 300.

Layers 314, 318, 322, 324 generally define a supported susceptor film 312' similar to the supported susceptor film 312. In this embodiment, the two supported susceptor films 312, 312' are in a "stacked" configuration and joined to one another by the discontinuous layer of adhesive 316.

FIG. 4 schematically illustrates still another exemplary susceptor structure 400. In this example, the structure 400 includes a supported susceptor film 412 joined to a microwave energy interactive insulating material 422 using a discontinuous layer of adhesive 416.

The supported susceptor film 412 comprises a susceptor layer 404 supported on a polymer film layer 406 to define a susceptor film 402. The susceptor film 402 is joined to a moisture-containing layer 408 (e.g., paperboard) with a substantially continuous layer of adhesive 410.

The microwave energy interactive insulating material 422 includes a susceptor layer 418 supported on a first polymer film 424, collectively forming a susceptor film 402'. The susceptor film 402' is joined to a moisture-containing substrate or support 426 (e.g., paper) using a substantially continuous layer of adhesive 428, such that layers 418, 424, 426, 428 define a supported susceptor film 412' similar to supported susceptor film 412. The microwave energy interactive insulating material 422 also includes an adjoining layer 414, in this example, a second polymer film 414 joined to the moisture-containing support 426 in a patterned configuration using an adhesive 430 or any other suitable fastening material or technique. The pattern of adhesive 430 generally defines a plurality of non-adhesive areas surrounded by adhesive areas, such that a plurality of closed cells 432 are formed between the support 426 and the second polymer film 414. The closed cells 432 are operative for inflating or expanding upon sufficient exposure to microwave energy, as will be discussed further below. In one example, the pattern of adhesive 430 may be a grid pattern, such that the closed cells 432 have a generally square shape. However, any suitable pattern of adhesion and shape of closed cells 432 may be used.

Figure 4A:
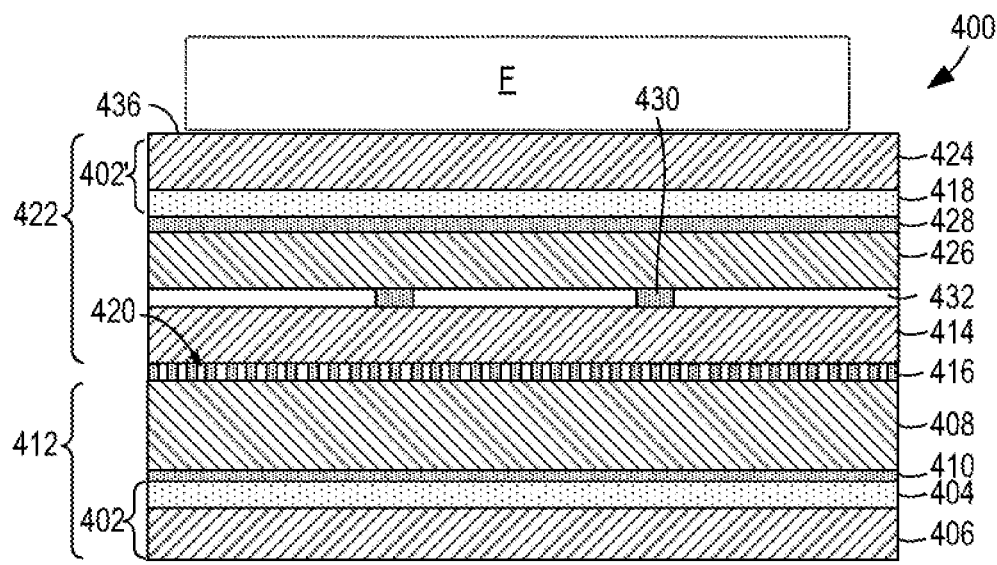
FIG. 4A is a schematic cross-sectional view of yet another exemplary microwave energy interactive structure.
Figure 4B:
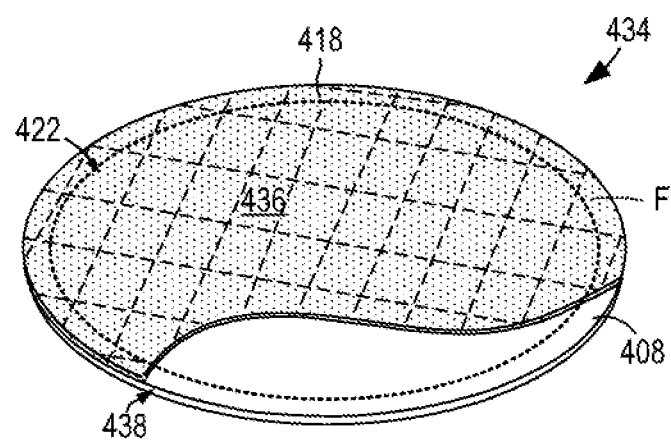
FIG. 4B is a schematic, partially cutaway, perspective view of a first side of a construct for heating, browning, and/or crisping a food item in a microwave oven, formed from the susceptor structure of FIG. 4A.
Figure 4C:
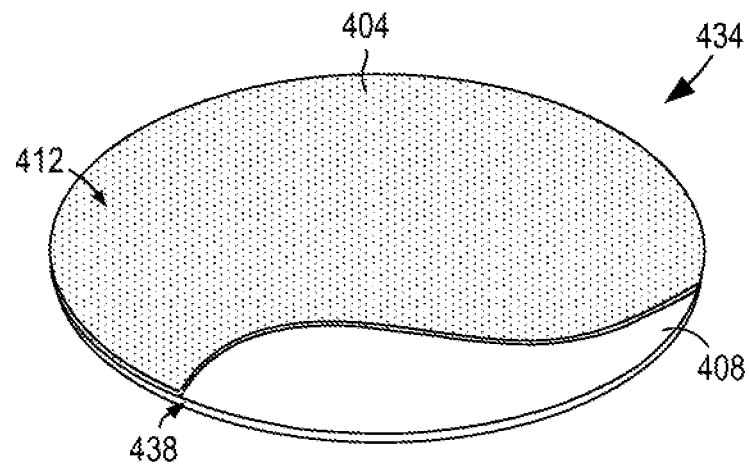
FIG. 4C is a schematic, partially cutaway, perspective view of a second side of a construct for heating, browning, and/or crisping a food item in a microwave oven, formed from the susceptor structure of FIG. 4A.

The structures 100, 200, 300, 400 of FIGS. 1A, 2, 3, 4A and numerous others encompassed by the present disclosure may be used to form various microwave heating constructs, including, for example, cartons, trays, platforms, disks, sleeves, pouches, and so forth. By way of example, and not limitation, FIGS. 4B and 4C schematically depict partial cutaway views of opposed first and second sides of an exemplary microwave energy interactive construct 434 formed (e.g., cut) from the susceptor structure 400 of FIG. 4A. In this example, the construct 434 has a generally circular shape, and therefore may be referred to as a microwave energy interactive heating disk. The construct 434 may be used for heating, browning, and/or crisping a generally circular food item, for example, a pizza, in a microwave oven. However, numerous other regular and irregular shapes are contemplated.

Figure 4D:
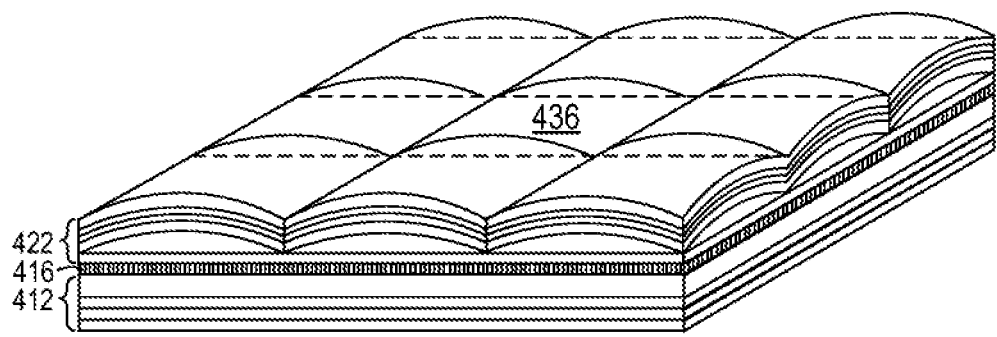
FIG. 4D is a schematic perspective view of a portion of the construct of FIGS. 4B and 4C, after sufficient exposure to microwave energy.
Figure 4E:
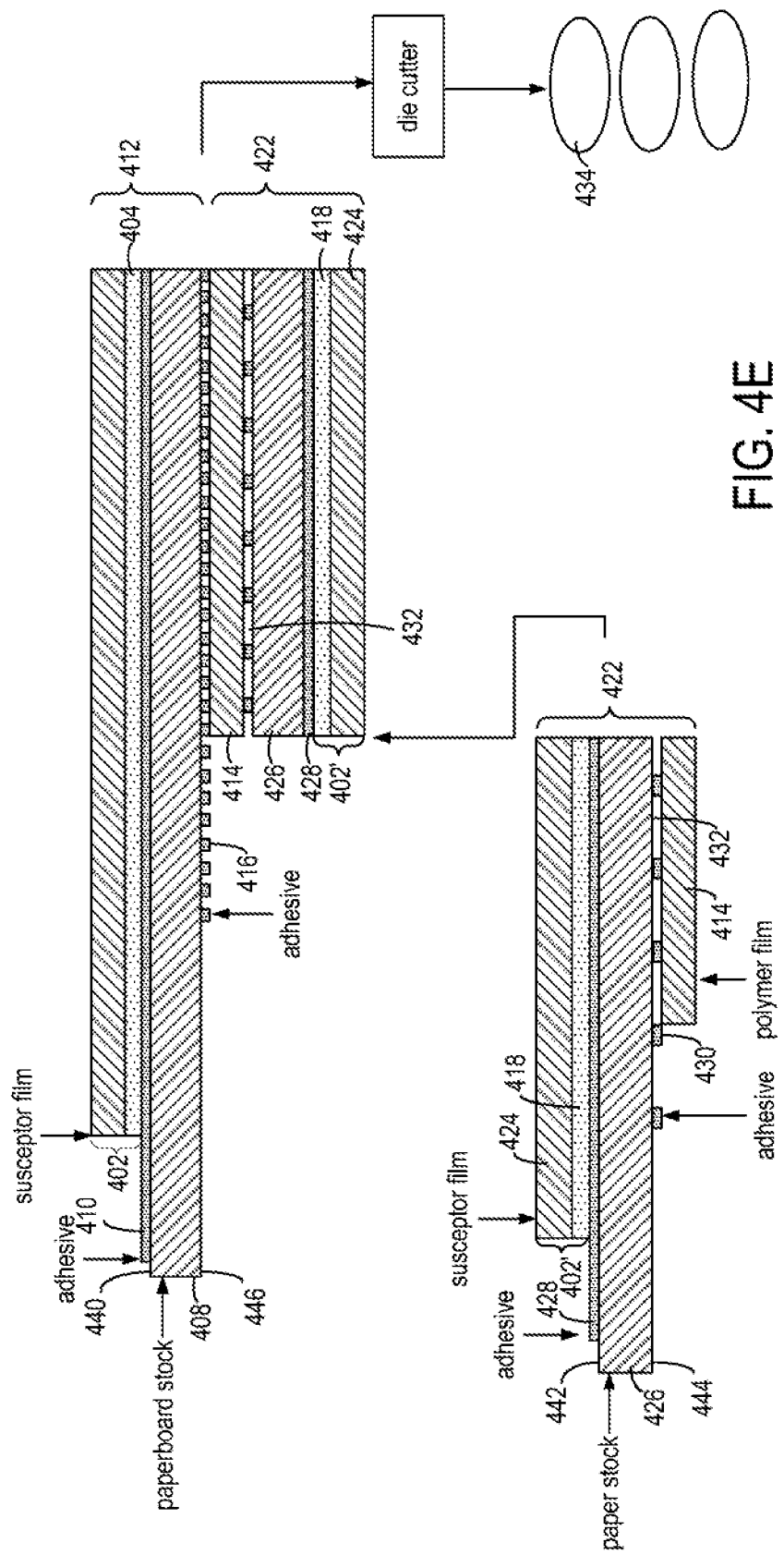
FIG. 4E is a diagram of an exemplary process for forming the structure and construct of FIGS. 4A-4D.

To use the construct 434, the food item F (e.g., a pizza) may be placed on a food-contacting surface 436 of the microwave energy interactive insulating material 422 (i.e., on the outermost surface of polymer film 424, although it is contemplated that the construct 434 may be inverted and the outermost surface of polymer film 406 may comprise the food-contacting surface in other embodiments) and placed in a microwave oven. While not wishing to be bound by theory, it is believed that as the susceptor 418 (shown schematically with stippling in FIG. 4B) heats upon impingement by microwave energy, water vapor and other gases typically held in the substrate 426, for example, paper, and any air trapped in the closed cells 432 between the second polymer film 414 and the substrate 426, expand, thereby causing the susceptor film 402' and substrate 426 to loft or bulge away from the second polymer film 414, as schematically illustrated in FIG. 4D (which depicts only a portion of the microwave energy interactive heating disk 434). The resulting insulating material 422 has a quilted or pillowed food-contacting side or surface 436. In this inflated or expanded state, the susceptor 418 is urged towards the surface of the food item (e.g., the bottom surface of the food item F), to enhance browning and/or crisping, with the pillowed surface of the insulating material 422 being able to conform more closely to the contours of the food item. For example, where the food item is a pizza, which tends to dome or crown during the freezing process, the expandable cells 432 of the insulating material 422 may be brought into closer proximity with the domed area of the pizza, thereby providing enhanced browning and/or crisping as compared with a flat susceptor sheet. Further, the water vapor and other gases trapped in the cells 432 reduce the amount of heat transferred from the construct 434 to the microwave heating environment, thereby further enhancing heating, browning, and/or crisping of the food item F. Additional features of microwave energy interactive insulating materials are described in detail in U.S. Pat. Nos. 7,019,271, 7,351,942, and 7,923,669, each of which is incorporated by reference herein in its entirety. When microwave heating has ceased, the cells 432 typically deflate and return to a somewhat flattened state having a somewhat wrinkled appearance (not shown).

Likewise, upon sufficient exposure to microwave energy, susceptor 404 (shown schematically with stippling in FIG. 4C) on the opposite side of the disk 434 converts at least a portion of the impinging microwave energy into thermal energy, which then can be transferred through the paperboard layer 408 towards the lower surface of the food item F to enhance browning and/or crisping even further. Any water vapor generated by the heating of the susceptor 404 can be released from the paperboard 408 and transported through the passageways 420 in the discontinuous adhesive layer 416 (FIG. 4A) to the exposed edges 438 of the construct 434.

Various methods of forming the construct 434 are contemplated. In one exemplary method schematically illustrated in FIG. 4E, a paperboard base material 408 is unwound from a stock roll (not shown). An adhesive 410 is applied to one side 440 of the paperboard 408 in a substantially continuous configuration. A susceptor film 402 is then applied to the layer of adhesive 410 with the metal layer 404 of the susceptor film 402 facing the adhesive 410 to form the supported susceptor film 412, which defines the second side of the construct 434, shown in FIG. 4C.

In another operation that may or may not be integrated with the remainder of the process, paper 426 is unwound from a stock roll (not shown). A substantially continuous layer of adhesive 428 is applied to a first side 442 of the paper 426. A susceptor film 402' is then applied to the layer of adhesive 428 with the metal layer 418 of the susceptor film 402' facing the adhesive 428. An adhesive 430 is then applied to the exposed side (i.e. the second side 444) of the paper 426 in a grid-like configuration. A polymer film 414 is then applied to the adhesive 430 to define a plurality of substantially closed cells 432 between the paper 426 and the polymer film 414. This forms the microwave energy interactive insulating material 422 on the first side of the construct (FIG. 4B).

Returning to the supported susceptor film 412 previously formed, an adhesive 416 is applied in a patterned configuration (e.g., a dot pattern or other pattern, such as, but not limited to, the adhesive patterns shown in FIGS. 1B-1E) to the exposed side 446 of the paperboard 408. The microwave energy interactive insulating material 422 formed previously is then applied to the layer of adhesive 416 to join the polymer film 414 to the paperboard 408. This forms the first side (i.e., the food-contacting side) of the construct 434 (FIG. 4B).

The web is then sent to a die cutter, where the construct 434 is cut into the desired shape, for example, a circle (e.g., FIGS. 4B and 4C), square, oval triangle, or any other desired shape.

It will be apparent that numerous other sequences of steps may be used to form the construct 434. It also will be apparent that numerous other microwave energy interactive insulating materials or structures may be used to form a construct in accordance with the disclosure. Any of such materials may be used alone or in combination, and in any configuration, to form the construct. Where multiple materials (or multiple layers of the same material) are used, the materials may be joined to one another partially or completely, or may remain separate from one another (i.e., unjoined).

Figure 5:
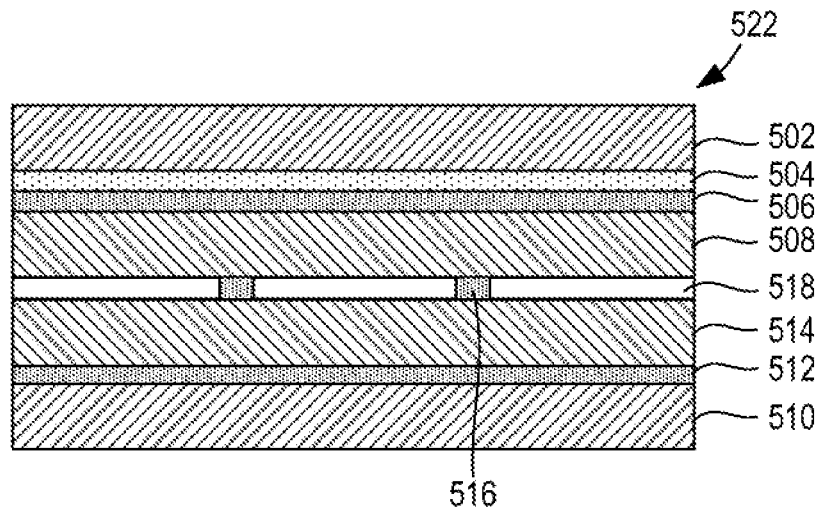
FIGS. 5-7 are schematic cross-sectional views of exemplary microwave energy interactive insulating materials that may be used in the construct of FIGS. 4B and 4C.

For example, FIG. 5 schematically illustrates another exemplary microwave energy interactive insulating material 522 that may be used instead of the microwave energy interactive insulating material 422 shown in FIGS. 4A-4D. In this example, the structure 522 includes a polymer film layer 502, a susceptor layer 504, an adhesive layer 506, and a paper layer 508. Additionally, the structure 500 includes a second polymer film layer 510, adhesive layer 512, and paper layer 514. The layers may be adhered or affixed by a patterned adhesive 516 that defines a plurality of substantially closed, expandable cells 518 between the paper layers 508, 514.

Figure 6:
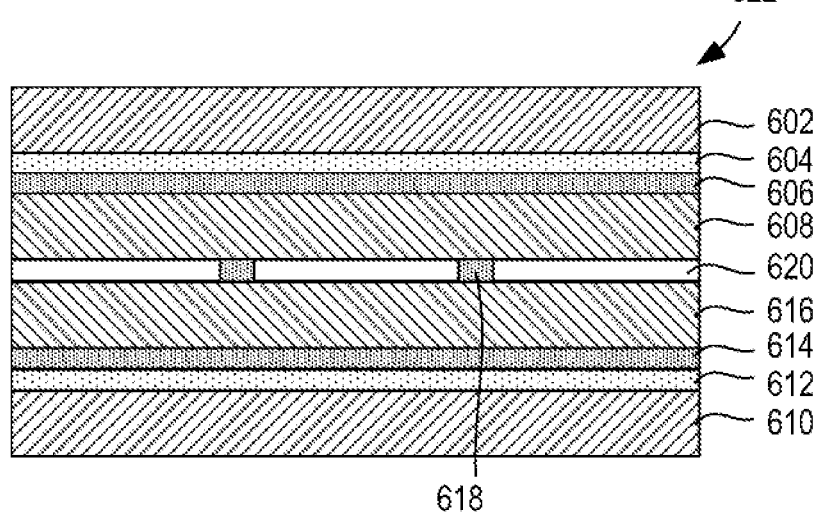

Likewise, FIG. 6 schematically illustrates yet another exemplary microwave energy interactive insulating material 622 that may be suitable for use instead of the insulating material 422 shown in FIGS. 4A-4D. In this example, the insulating material 622 includes a pair of adjoined, symmetrical layer arrangements. If desired, the two symmetrical arrangements may be formed by folding one layer arrangement onto itself.

The first symmetrical layer arrangement, beginning at the top of the drawing, comprises a polymer film layer 602, a susceptor layer 604, an adhesive layer 606, and a paper or paperboard layer 608. The adhesive layer 606 joins the polymer film 602 and the susceptor layer 604 to the paperboard layer 608. The second symmetrical layer arrangement, beginning at the bottom of the drawing, also comprises a polymer film layer 610, a susceptor layer 612, an adhesive layer 614, and a paper or paperboard layer 616. A patterned adhesive layer 618 is provided between the two paper layers 608, 616 to define a plurality of closed cells 620 that are adapted to inflate when sufficiently exposed to microwave energy. While not wishing to be bound by theory, it is believed that the additional susceptor layer results in greater heating and expansion of the insulating cells, thereby providing more thermal insulation as compared with an insulating material having a single susceptor layer.

It will be recognized that each of the exemplary insulating materials previously described include a moisture-containing layer (e.g. paper) that is believed to release at least a portion of the vapor that inflates the expandable cells. However, it is contemplated that insulating structures without such moisture-containing layers also may be used instead of the insulating material 422 shown in FIGS. 4A-4D to form the construct 434 (or any other construct).

Figure 7:
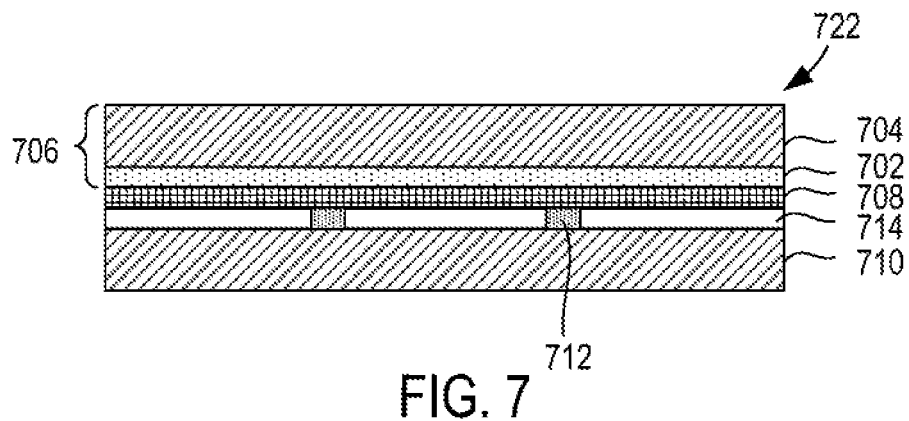

For example, FIG. 7 illustrates one example of an expandable cell insulating material 722 that inflates without the need for a moisture-containing layer, for example, paper. In this example, one or more reagents are used to generate a gas that inflates the cells.

A thin layer of microwave interactive material 702 is supported on a first polymer film 704 to form a susceptor film 706. One or more reagents 708, optionally within a coating, lie adjacent at least a portion of the layer of microwave interactive material 702. The reagent 708 coated susceptor film 706 is joined to a second polymer film 710 using a patterned adhesive 712 or other material, or using thermal bonding, ultrasonic bonding, or any other suitable technique, such that closed cells 714 (shown as a void) are formed in the material 700.

Numerous reagents may be suitable for use in the structure 722. For example, the reagents may comprise sodium bicarbonate (NaHCO3) and a suitable acid. When exposed to heat, the reagents react to produce carbon dioxide. As another example, the reagent may comprise a blowing agent. Examples of blowing agents that may be suitable include, but are not limited to, p-p'-oxybis(benzenesulphonylhydrazide), azodicarbonamide, and p-toluenesulfonylsemicarbazide. However, it will be understood that numerous other reagents and released gases are contemplated hereby.

As the microwave energy interactive material 702 heats upon impingement by microwave energy, water vapor or other gases are released from (or generated by) the reagent 708, thereby exerting pressure on the susceptor film 706 on one side and the second polymer film 710 on the other side of the closed cells 714, as discussed in connection with the various other insulating materials described above. Even without a paper or paperboard layer, the gas resulting from the reagent is sufficient both to inflate the expandable cells and to absorb any excess heat from the susceptor. Such materials are described further in U.S. Pat. No. 7,868,274, which is incorporated by reference herein in its entirety.

Countless other microwave energy interactive structures and constructs are contemplated by the disclosure. If desired, any of such structures may include one or more areas that are transparent to microwave energy. Such microwave energy transparent areas transmit microwave energy and, in some instances, may cause the formation of localized electric fields that enhance heating, browning, and/or crisping of an adjacent food item. The transparent areas may be sized, positioned, and/or arranged to customize the heating, browning, and/or crisping of a particular area of the food item to be heated.

Figure 8A:
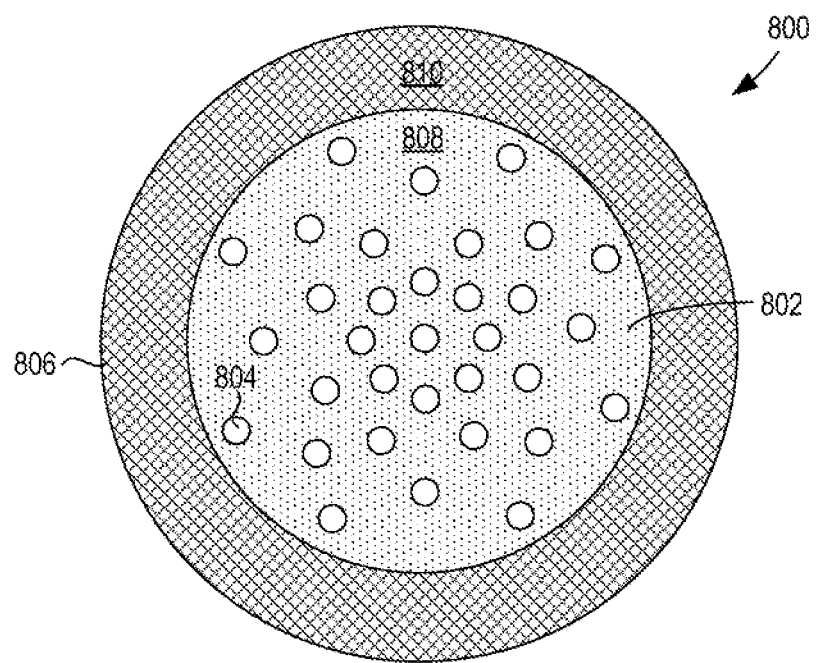
FIG. 8A is a schematic top plan view of an exemplary microwave heating construct including a plurality of microwave energy transparent areas.

For example, FIG. 8A schematically illustrates a top plan view of another microwave heating construct 800 (e.g., a microwave heating disk) that generally includes a susceptor 802 (shown schematically with stippling) that circumscribes a plurality of microwave energy transparent areas 804, 806 (shown schematically in white). In this example, the disk 800 has a substantially circular shape. However, any regular or irregular shape may be used.

The disk 800 includes a central region 808 and a peripheral region 810. In the central region 808 of the disk 800, the microwave energy transparent areas 804 are substantially circular in shape, with the concentration of microwave energy transparent areas 804 decreasing from the center of the disk 800 outwardly towards the peripheral region 810. However, other configurations are contemplated. For example, another exemplary arrangement of microwave energy transparent areas is disclosed in U.S. Pat. Nos. 6,414,290 and 6,765,182, which are incorporated by reference herein in their entirety.

In the peripheral region 810, the microwave energy transparent areas 806 are substantially square in shape and arranged in rows and columns, such that the microwave energy interactive material in the peripheral region 810 has a grid-like appearance. As stated above, the percent transparent area may be varied as needed to achieve the desired heating, browning, and/or crisping of the food item. Such areas may be formed in any suitable manner, as will be described below.

Figure 8B:
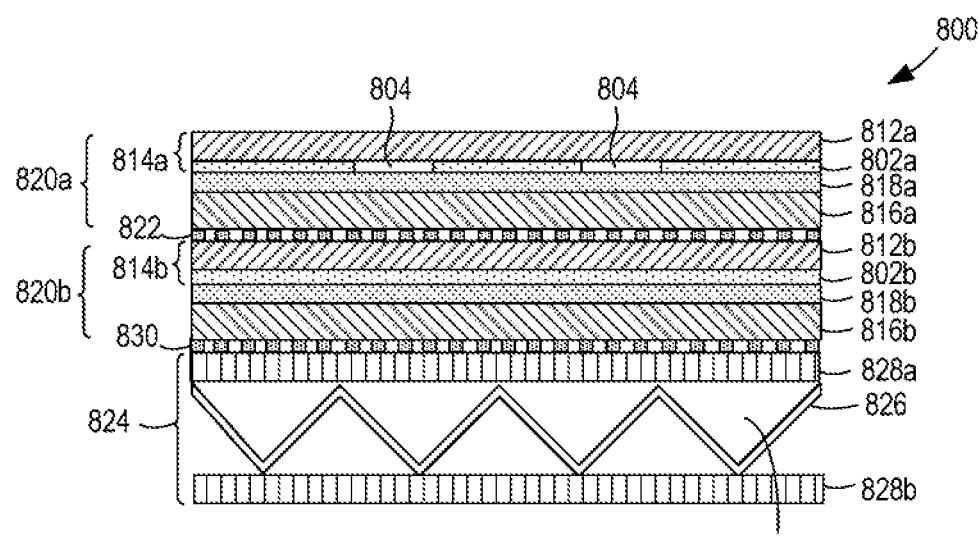
FIG. 8B is a schematic cross-sectional view of a portion of the construct of FIG. 8A.

FIG. 8B schematically illustrates a cross-sectional view of a portion of the microwave heating disk 800 of FIG. 8A. The microwave heating disk 800 includes a pair of microwave energy interactive elements 802a, 802b, for example, susceptors (or susceptor layers), supported on respective microwave energy transparent substrates 812a, 812b, for example, polymer film layers, to collectively define respective susceptor films or susceptor film layers 814a, 814b. Susceptor 802a circumscribes at least one, and in some examples, a plurality, of microwave energy transparent (i.e., inactive) areas 804 (or 806, FIG. 8A).

Each susceptor is joined respectively to a respective microwave energy transparent, dimensionally stable support or support layer 816a, 816b, for example, paper, using a respective substantially continuous adhesive layer 818a, 818b to define respective supported susceptor films 820a, 820b. The supported susceptor films 820a, 820b may be joined to one another using a discontinuous layer of adhesive 822 (e.g., a dot pattern or other pattern, such as, but not limited to, the adhesive patterns shown in FIGS. 1B-1E). In turn, support layer 816b is joined to a double faced corrugated material 824, which includes a plurality of flutes or corrugations 826 between facing layers 828a, 828b.

In the illustrated embodiment, the support layer 816b is joined to the facing layer 828a using a discontinuous layer of adhesive 830. However, in some embodiments, the layer of adhesive 830 may be substantially continuous. While not wishing to be bound by theory, it is believed that some facing layers 828a are somewhat textured and/or porous, which may allow water vapor to be vented from the support layer 816b without causing delamination of the layers 816b, 828a.

In another embodiment (not shown), the support layer 816b and discontinuous adhesive layer 830 may be omitted, such that the susceptor film 814b is joined directly to the facing layer 828a. In such a case, the layer of adhesive 818b joining the susceptor film 814b to the facing layer 828a may be substantially continuous (as shown).

Numerous other microwave heating constructs are encompassed by the disclosure. Any of such structures or constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors are illustrated herein, the construct also may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where the food item is prone to scorching or drying out during heating and therefore, may be referred to as shielding elements. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture" (not shown). A non-physical aperture is a microwave energy transparent area (e.g., microwave energy transparent areas 804, 806) that allows microwave energy to pass through the structure without an actual void or hole cut through the structure. Such areas may be formed by simply not applying microwave energy interactive material to the particular area, or by removing microwave energy interactive material in the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive (i.e., microwave energy transparent) area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance heating, browning, and/or crisping.

In some instances, it may be beneficial to create one or more discontinuities or inactive regions to prevent overheating or charring of the construct. Such areas may be formed by forming these areas of the construct without a microwave energy interactive material, by removing any microwave energy interactive material that has been applied, or by deactivating the microwave energy interactive material in these areas, as discussed above.

Further still, one or more panels, portions of panels, or portions of the construct may be designed to be microwave energy inactive to ensure that the microwave energy is focused efficiently on the areas to be heated, browned, and/or crisped, rather than being lost to portions of the food item not intended to be browned and/or crisped or to the heating environment. This may be achieved using any suitable technique, such as those described above.

As stated above, the microwave energy interactive material (e.g., susceptors 104, 118, 204, 218, 304, 318, 404, 418, 504, 604, 612, 702, 802*a*, 802*b*) may be supported on a microwave inactive or transparent substrate (e.g., polymer films 106, 206, 224, 306, 314, 406, 424, 502, 602, 610, 704, 812*a*, 812*b*) for ease of handling and/or to prevent contact between the microwave energy interactive material and the food item. The outermost surface of the polymer film may define at least a portion of the food-contacting surface of the package (e.g., surface 436 of polymer film 424). Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Numerous materials may serve as a moisture-containing layer (e.g., moisture-containing layers 108, 208, 214, 308, 408, 816a) in the various structures and constructs. In one example, the moisture-containing layer comprises paper having basis weight of from about 15 to about 60 lbs/ream (lb/3000 sq. ft.), for example, from about 20 to about 40 lbs/ream. In another example, the paper has a basis weight of about 25 lbs/ream. In another example, the moisture-containing layer comprises paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

The package may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of the package to be formed (e.g., a blank).

It will be understood that with some combinations of elements and materials, the microwave energy interactive element may have a grey or silver color that is visually distinguishable from the substrate or the support. However, in some instances, it may be desirable to provide a package having a uniform color and/or appearance. Such a package may be more aesthetically pleasing to a consumer, particularly when the consumer is accustomed to packages or containers having certain visual attributes, for example, a solid color, a particular pattern, and so on. Thus, for example, the present disclosure contemplates using a silver or grey toned adhesive to join the microwave energy interactive element to the support, using a silver or grey toned support to mask the presence of the silver or grey toned microwave energy interactive element, using a dark toned substrate, for example, a black toned substrate, to conceal the presence of the silver or grey toned microwave energy interactive element, overprinting the metallized side of the polymer film with a silver or grey toned ink to obscure the color variation, printing the non-metallized side of the polymer film with a silver or grey ink or other concealing color in a suitable pattern or as a solid color layer to mask or conceal the presence of the microwave energy interactive element, or any other suitable technique or combination of techniques.

The disclosure may be understood further from the following example, which is not intended to be limiting in any manner.

EXAMPLE 1

Two supported susceptor films were joined to one another with their respective paper support layers facing one another using a continuous layer of adhesive. The resulting structure was heated without a load (i.e., without a food item) in a microwave oven for about 20 seconds. The layers of the structure began to delaminate and loft away from one another.

The supported susceptor films then were joined to one another with their respective paper support layers facing one another using a patterned adhesive. In particular, the patterned adhesive consisted of a dot pattern, where the dots had a diameter of about 0.125 in. and a spacing of about 0.0625 in. The resulting structure was heated without a load (i.e., without a food item) in a microwave oven for about 20 seconds. The layers of the structure remained intact.

EXAMPLE 2

A first supported susceptor film comprising a metalized polyethylene terephthalate film joined to paperboard was pressed into a tray including a pair of elevated platforms. Such trays are described in U.S. Patent Application Publication Nos. US 2008/0164178 A1, published Jul. 10, 2008, and US 2008/0000896 A1, published Jan. 3, 2008, which are incorporated by reference herein in their entirety. The tray was used to heat a 10" Tombstone pizza in a microwave oven for about 5 minutes. The bottom crust of the pizza was browned and or crisped acceptably.

A second tray was formed by joining a second supported susceptor film to the first supported susceptor film. The second supported susceptor film included a metalized polyethylene terephthalate film joined to paper. The first and second supported susceptor films were joined to one another with the paperboard and paper layer facing one another using the dot adhesive pattern described in Example 1. The tray was used to heat a 10" Tombstone pizza in a microwave oven for about 5 minutes. The bottom crust of the pizza was browned and or crisped exceptionally. Thus, although the single susceptor tray produced suitable results, the dual susceptor structure achieved superior browning and crisping of the pizza crust.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave energy interactive structure comprising:
 a first supported susceptor film and a second supported susceptor film joined to one another, the first supported susceptor film and the second supported susceptor film each comprising microwave energy interactive material supported on a polymer film, the microwave energy interactive material being joined to a dimensionally stable support layer, wherein the first supported susceptor film and second supported susceptor film are joined to one another by a first layer of adhesive disposed between the support layer of the first supported susceptor film and the polymer film of the second supported susceptor film, the first layer of adhesive being discontinuous so that a plurality of unjoined areas are defined between the support layer of the first supported susceptor film and the polymer film of the second supported susceptor film; and a corrugated material joined to the support layer of the second supported susceptor film by a second layer of adhesive.

2. The microwave energy interactive structure of claim 1, wherein the first layer of adhesive covers less than 80% of the support layer of the first supported susceptor film.

3. The microwave energy interactive structure of claim 1, wherein the first layer of adhesive covers 35% of the support layer of the first supported susceptor film.

4. The microwave energy interactive structure of claim 1, wherein the second layer of adhesive is substantially continuous.

5. The microwave energy interactive structure of claim 1, wherein the second layer of adhesive is discontinuous so that a plurality of unjoined areas are defined between the support layer of the second supported susceptor film and the corrugated material.

6. The microwave energy interactive structure of claim 1, wherein the microwave energy interactive material of the first supported susceptor circumscribes a plurality of transparent areas.

7. The microwave energy interactive structure of claim 6, wherein the plurality of microwave energy transparent areas includes a first plurality of microwave energy transparent areas defining a peripheral region of the microwave energy interactive structure and a plurality of second microwave energy transparent areas defining a central area of the microwave energy interactive structure.

8. The microwave energy interactive structure of claim 7, wherein each microwave energy transparent area of the first plurality of microwave energy transparent areas is substantially square in shape, such that the microwave energy interactive material has a substantially grid shape.

9. The microwave energy interactive structure of claim 7, wherein each microwave energy transparent area of the second plurality of microwave energy transparent areas is substantially circular in shape.

10. The microwave energy interactive structure of claim 1, wherein the corrugated material is a double faced corrugated material.

11. The microwave energy interactive structure of claim 1, comprising at least one peripheral edge and the unjoined areas being at least partially interconnected to define at least one passageway that is in communication with the at least one peripheral edge.

* * * * *